(12) United States Patent
Watanabe et al.

(10) Patent No.: US 12,151,515 B2
(45) Date of Patent: Nov. 26, 2024

(54) SENSOR ATTACHMENT STRUCTURE FOR STRADDLE-TYPE VEHICLE

(71) Applicant: SUZUKI MOTOR CORPORATION, Hamamatsu (JP)

(72) Inventors: Hideaki Watanabe, Hamamatsu (JP); Makoto Satou, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 13 days.

(21) Appl. No.: 17/941,804

(22) Filed: Sep. 9, 2022

(65) Prior Publication Data

US 2023/0140031 A1    May 4, 2023

(30) Foreign Application Priority Data

Nov. 4, 2021    (JP) ................................. 2021-180468

(51) Int. Cl.
*B60C 11/24* (2006.01)
*B62J 45/42* (2020.01)

(52) U.S. Cl.
CPC ............. *B60C 11/243* (2013.01); *B62J 45/42* (2020.02); *B60Y 2200/12* (2013.01)

(58) Field of Classification Search
CPC ..... B60C 11/243; B62J 45/42; B60Y 2200/12
See application file for complete search history.

(56) References Cited

U.S. PATENT DOCUMENTS

2015/0042062 A1* 2/2015 Takatsuka ............. B62J 45/423
                                                                  280/264
2019/0375255 A1* 12/2019 Seko ....................... B60C 23/20

FOREIGN PATENT DOCUMENTS

JP         2009-222458 A        10/2009
JP         2010281691 A    *   12/2010

OTHER PUBLICATIONS

Moss, Dave. "Driven's Mantis IR Sensor Technology—Dave Moss Tuning." Dave Moss Tuning—To Save a Life within the Motorcycling Community Every Day through Education and Training, Jan. 27, 2018, davemosstuning.com/drivens-mantis-ir-sensor-technology/. (Year: 2018).*

* cited by examiner

*Primary Examiner* — David Z Huang
*Assistant Examiner* — Jean F Morello
(74) *Attorney, Agent, or Firm* — Stein IP, LLC

(57) ABSTRACT

There is provided a sensor attachment structure for a straddle-type vehicle including: a sensor unit including a sensor configured to detect a state of a tire; and a fender formed along an outer surface shape of an upper portion of the tire. The sensor unit is attached to a rear portion of the fender and faces the tire.

10 Claims, 7 Drawing Sheets

SENSOR ATTACHMENT STRUCTURE FOR STRADDLE-TYPE VEHICLE

CROSS-REFERENCE TO RELATED APPLICATIONS

This application is based on Japanese Patent Application No. 2021-180468 filed on Nov. 4, 2021, the contents of which are incorporated herein by way of reference.

TECHNICAL FIELD

The present invention relates to a sensor attachment structure for a straddle-type vehicle.

BACKGROUND

In a straddle-type vehicle, good traveling stability is obtained by traveling in a state where tires have high ground contact property with respect, to a road surface. Examples of a condition for improving the ground contact property of a tire include that the tire has an appropriate air pressure and that the tire has an appropriate temperature. Therefore, it is effective to monitor air pressure information and temperature information of the tire while the straddle-type vehicle is traveling. As such a straddle-type vehicle, a vehicle attached with a sensor unit that detects air pressure information and temperature information of a tire of a wheel, and transmits the air pressure information and the temperature information to a control device by wireless communication is known (for example, see Patent Literature 1).
Patent Literature 1: JP-A-2009-222458

Depending on the vehicle type, weight reduction of a wheel and wired connection of the sensor unit may be required. Since the sensor unit disclosed in Patent Literature 1 is attached to a rim of the wheel, a weight increase of the wheel is increased, and the sensor unit cannot be connected in a wired manner. Although it is conceivable to attach the sensor unit to a portion other than the wheel, depending on the layout, there is also a problem that traveling wind may hit the sensor unit and air resistance increases.

The present invention has been made in view of the above, and an object thereof is to provide a sensor attachment structure for a straddle-type vehicle that can reduce an increase in the weight of a wheel and can be compatible with wired connection, and further reduce an increase in air resistance.

SUMMARY

A sensor attachment structure for a straddle-type vehicle according to an aspect of the present invention includes: a sensor unit including a sensor configured to detect a state of a tire; and a fender formed along an outer surface shape of an upper portion of the tire. The sensor unit is attached to a rear portion of the fender and faces the tire, thereby solving the above-described problem.

DESCRIPTION OF EMBODIMENTS

A sensor attachment structure for a straddle-type vehicle according to an aspect of the present invention is a structure for attaching a sensor unit to a fender. The sensor unit is provided with a sensor for detecting a state of a tire, and the tender is formed along an outer surface shape of an upper portion of the tire. Since the sensor unit is attached to the fender, an increase in the weight of the wheel can be reduced, and the sensor unit can be made compatible with the wired connection. In addition, the sensor unit is attached to a rear portion of the fender where traveling wind hardly hits, so that the traveling wind is less likely to hit the sensor unit, and an increase in air resistance is reduced.

Embodiment

Figure 1:
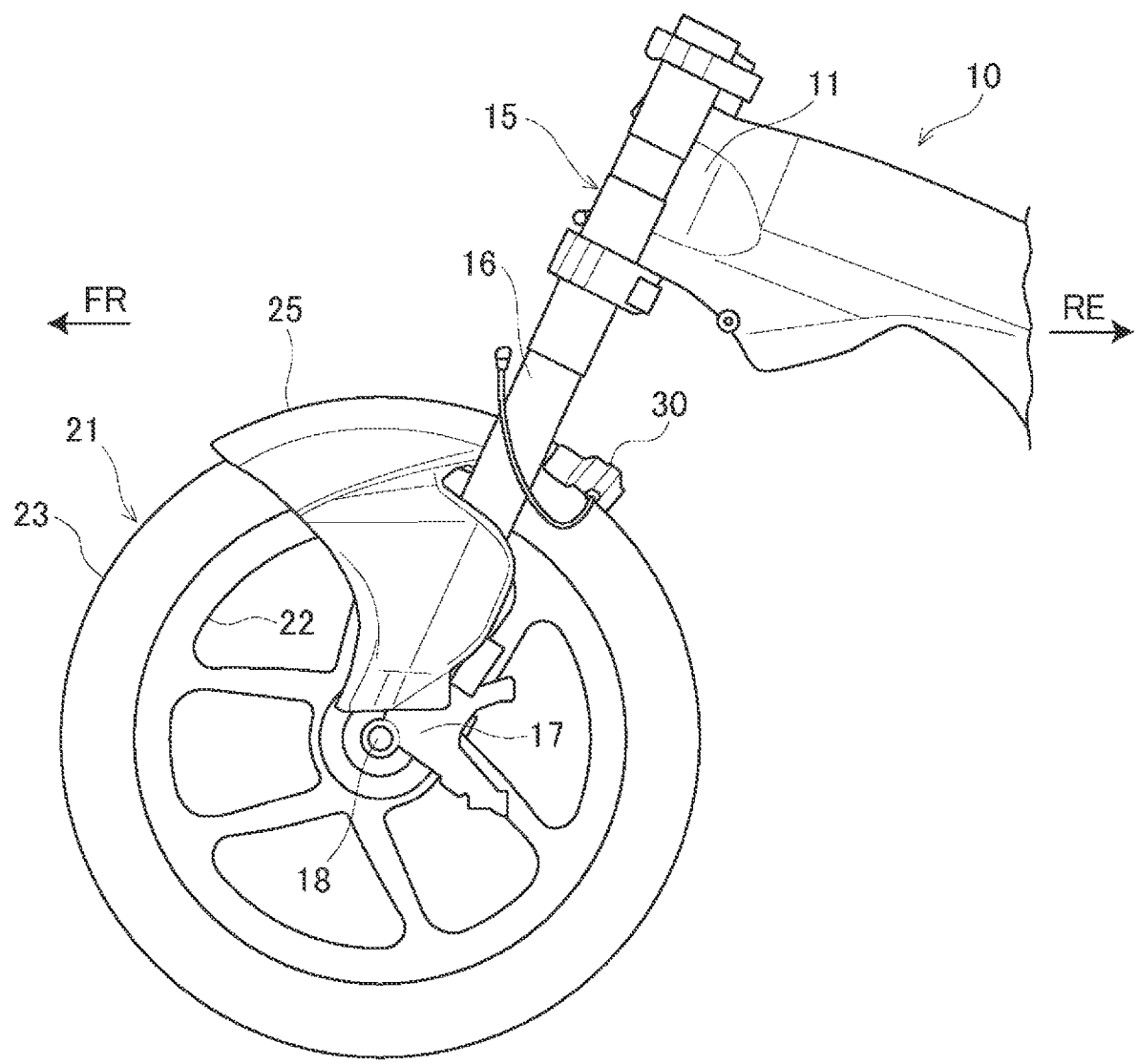
FIG. 1 is a left side view of a front portion of a vehicle according to the present embodiment.

Hereinafter, an embodiment will be described in detail with reference to the accompanying drawings. FIG. 1 is a left side view of a front portion of a vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a head pipe 11 is formed in a front portion of a vehicle frame 10 of a straddle-type vehicle. A front fork 15 is steerably supported by the head pipe 11 via a steering shaft (not shown). An axle bracket 17 is provided at a lower portion of a pair of fork tubes 16 of the front fork 15, and a front wheel 21 is rotatably supported by the axle bracket 17 via an axle 18. The front wheel 21 is formed by attaching a tire 23 to an outer peripheral surface of a wheel 22. A cast wheel in which a rim, a hub, and a spoke are integrally molded is used for the wheel 22 of the front wheel 21.

In order to confirm the ground contact property of the tire 23 of the front wheel 21, it is desired to detect a temperature of the tire 23 by a sensor unit 30. A sensor unit of a wireless type is provided on the wheel 22, but the sensor unit 30 of a wired type is employed for a model in which weight reduction of the front wheel 21 is desired, a model which is not compatible with wireless communication, or the like. The sensor unit 30 of a wired type is attached to a front fender (fender) 25, but the air resistance increases when traveling wind hits the sensor unit 30. Therefore, in the straddle-type vehicle of the present embodiment, an attachment structure suitable for the sensor unit 30 of a wired type is adopted.

Figure 2:
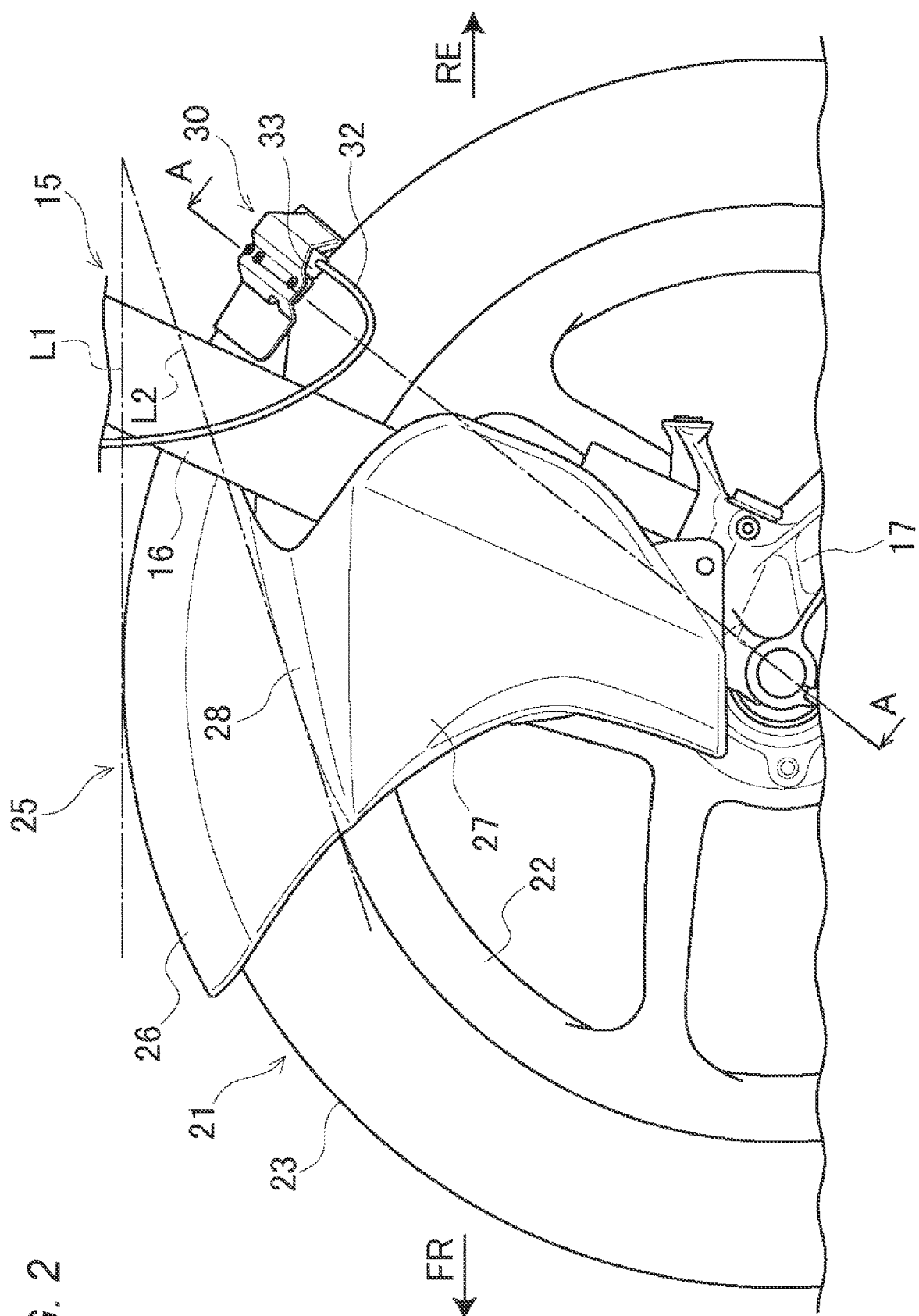
FIG. 2 is a left side view of periphery of a front wheel according to the present embodiment.
Figure 3:
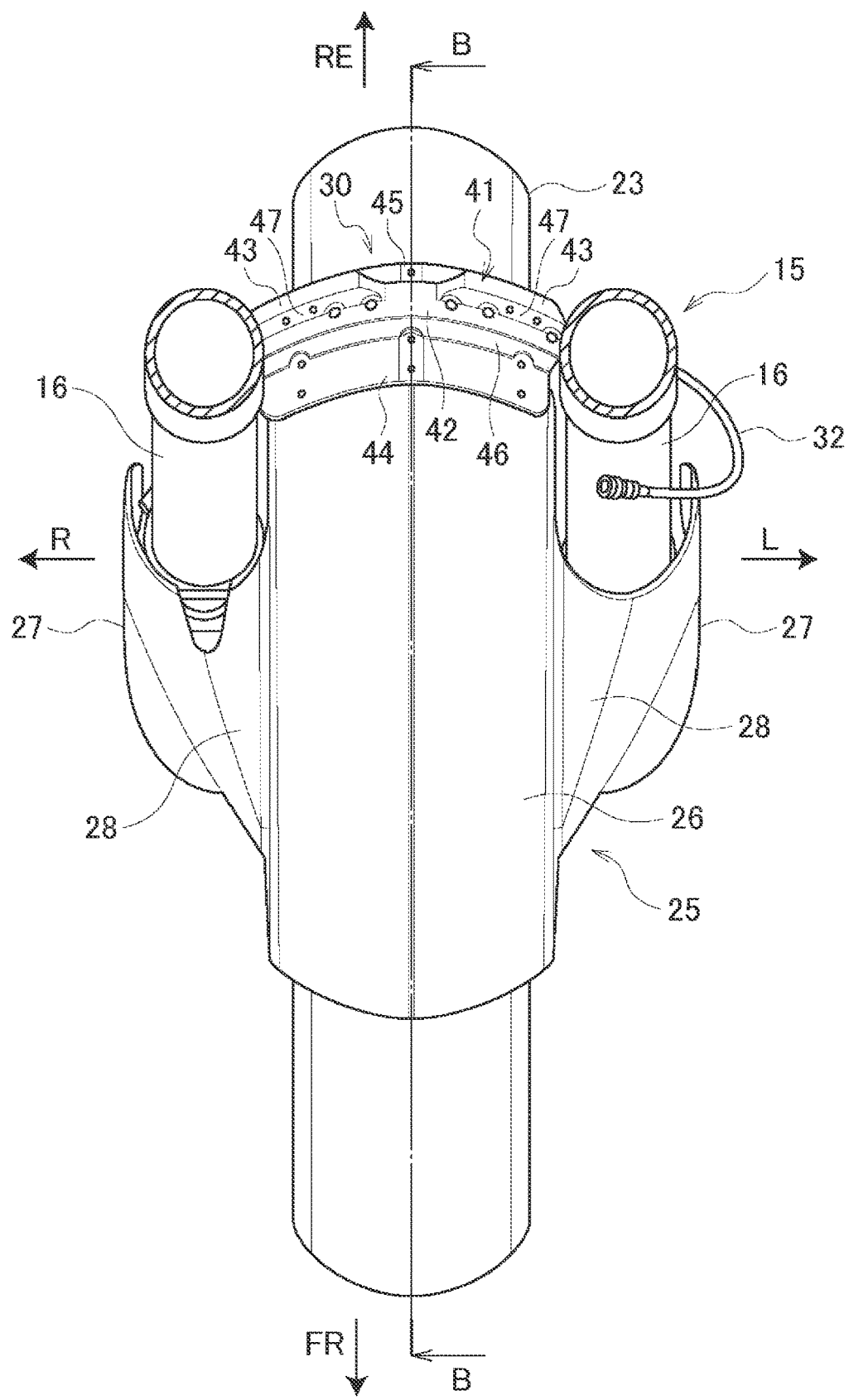
FIG. 3 is a top view of the periphery of the front wheel according to the present embodiment.
Figure 4:
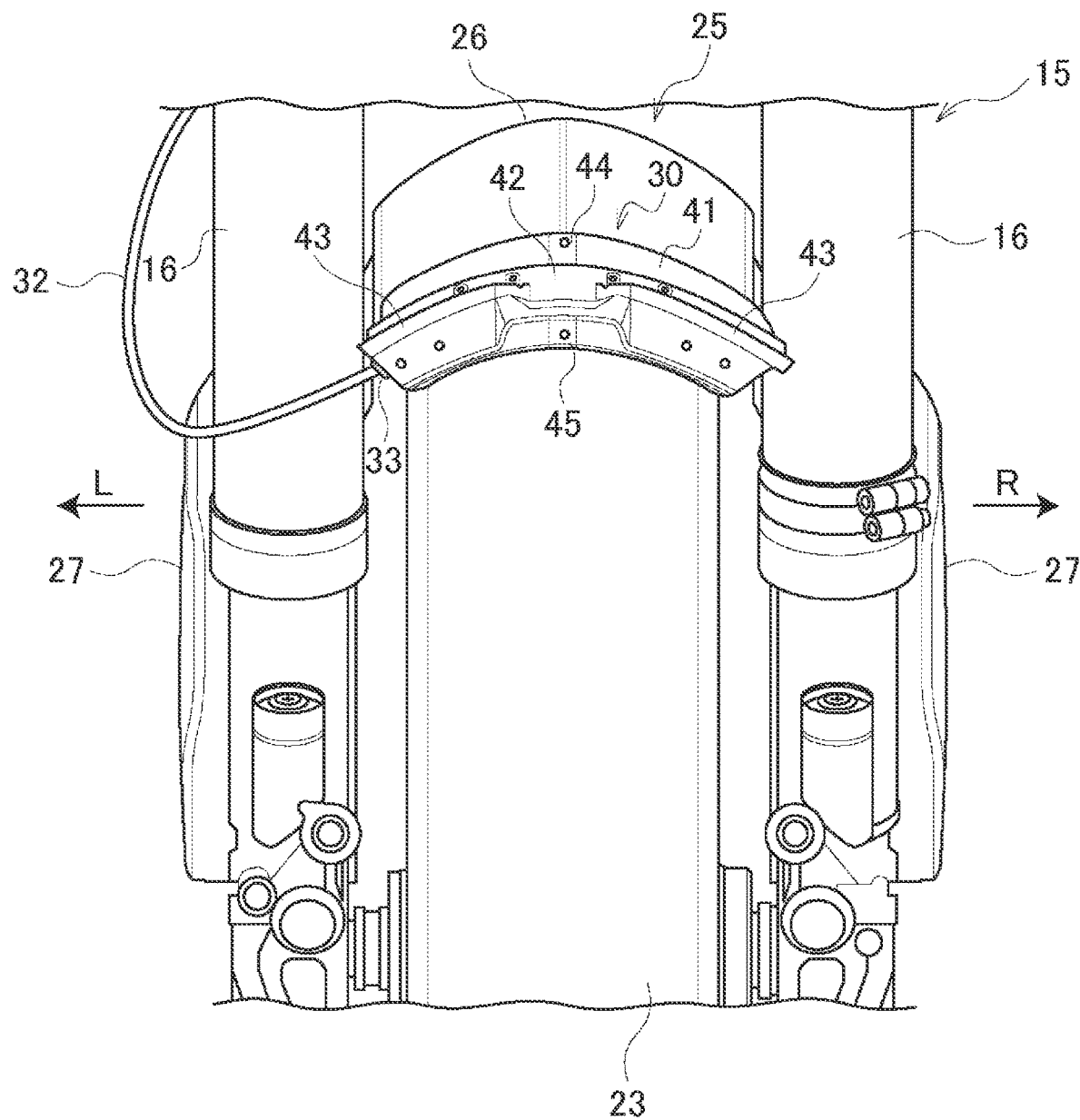
FIG. 4 is a rear view of the periphery of the front wheel according to the present embodiment.
Figure 5:
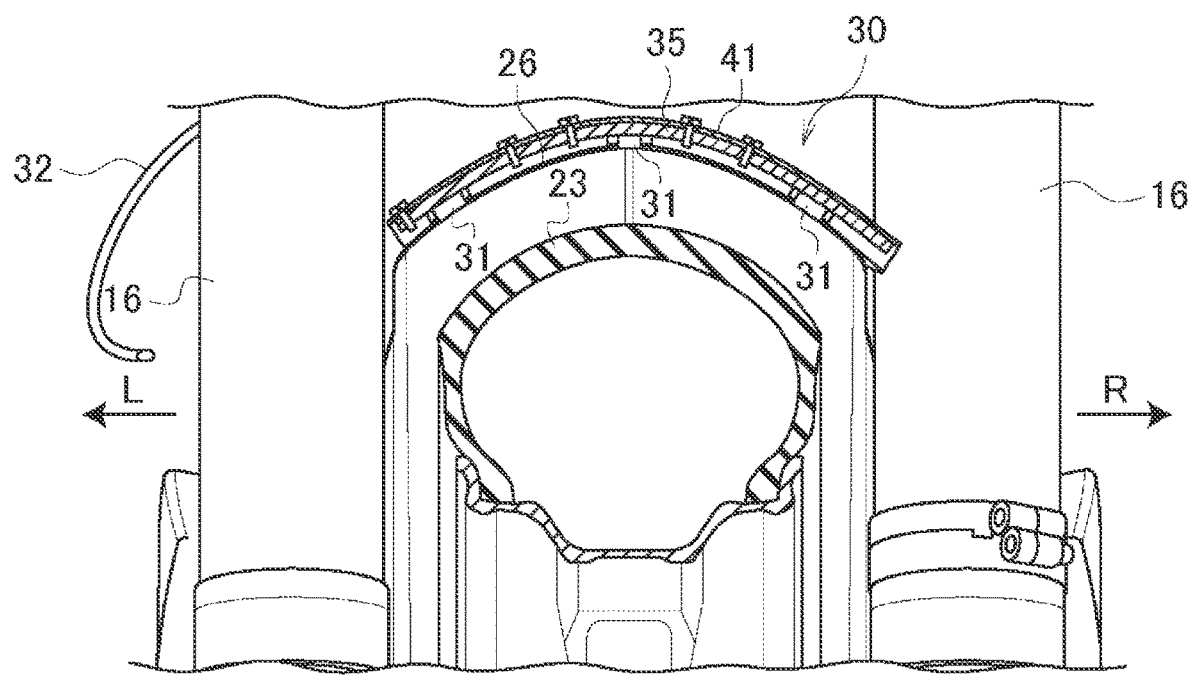
FIG. 5 is a sectional view of the periphery of the front wheel of FIG. 2 taken along a line A-A.
Figure 6:
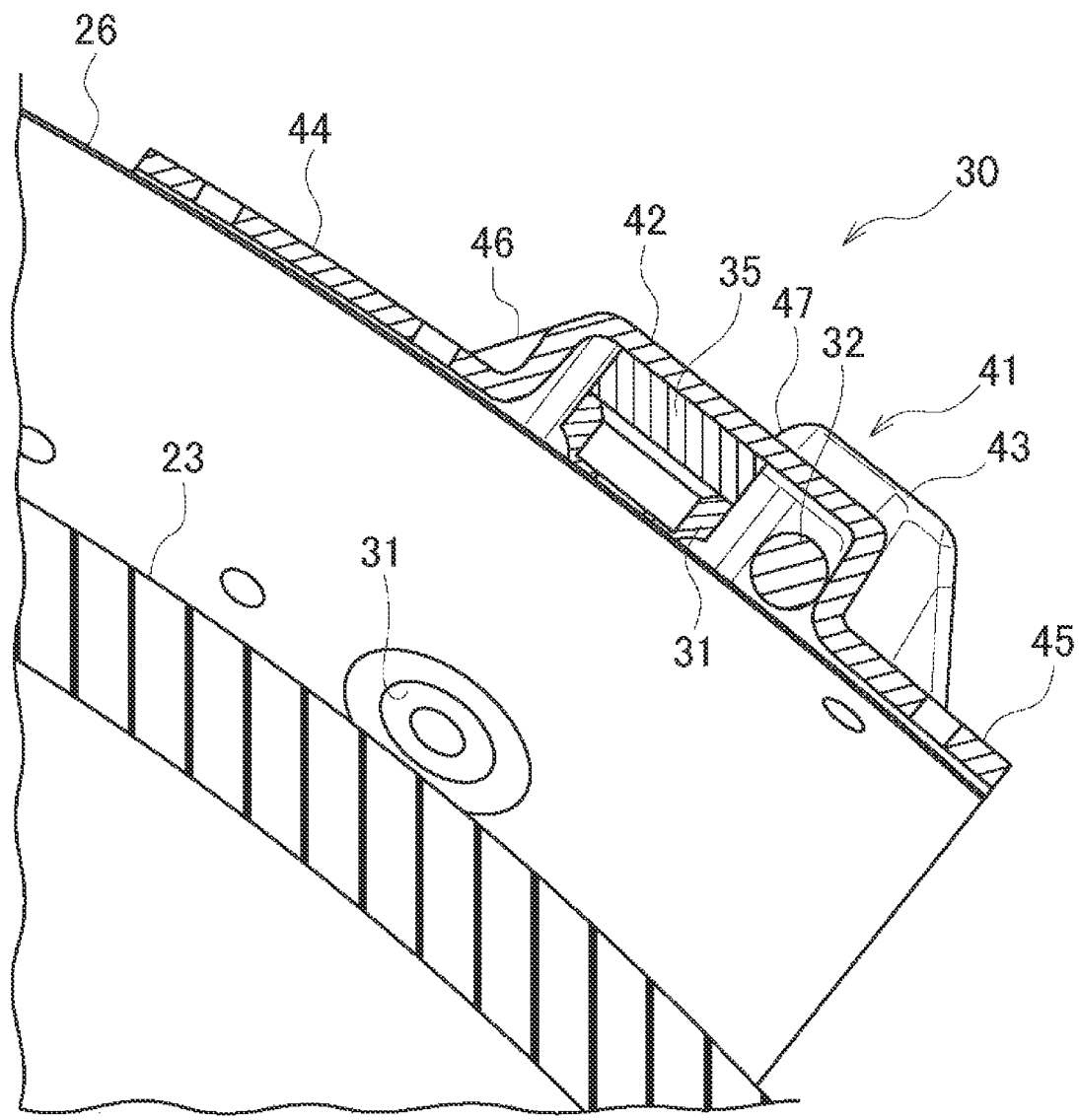
FIG. 6 is a sectional view of the periphery of the front wheel of FIG. 3 taken along a line B-B.

A sensor attachment structure for a straddle-type vehicle will be described with reference to FIGS. 2 to 6. FIG. 2 is a left side view of periphery of a front wheel according to the present embodiment. FIG. 3 is a top view of the periphery of the front wheel according to the present embodiment. FIG. 4 is a rear view of the periphery of the front wheel according to the present embodiment. FIG. 5 is a sectional view of the periphery of the front wheel of FIG. 2 taken along a line A-A. FIG. 6 is a sectional view of the periphery of the front wheel of FIG. 3 taken along a line B-B.

As shown in FIGS. 2 to 4, the front fender 25 made of resin is provided at a lower portion of the front fork 15. The front fender 25 is formed along an outer surface shape of an upper portion of the tire 23, and the front fender 25 suppresses the intrusion of a foreign matter into a mud guard and the front wheel 21. The front fender 25 includes a fender upper portion 26 that covers the upper portion of the tire 23, and fender side portions 27 that extend downward from left and right side edges of the fender upper portion 26. The fender upper portion 26 is formed so as to cover the tire 23 from above, and the fender side portion 27 bulge outward in a vehicle width direction so as to cover a lower portion of the fork tube 16 from a front side.

The sensor unit 30 is attached to a rear portion of the fender upper portion 26 so as to face the tire 23. The sensor unit 30 is provided with a plurality of (three in the present embodiment) temperature sensors 31 (see FIG. 6) as sensors for detecting a state of the tire 23. A temperature of the tire 23 is detected in a non-contact manner during traveling by the plurality of temperature sensors 31. A wire 32 extends from the sensor unit 30 toward a control device (not shown), and a detected temperature is transmitted from the plurality of temperature sensors 31 to the control device through the wire 32. As described above, in the straddle-type vehicle of the present embodiment, the sensor unit 30 of a wired type is attached to the front fender 25.

An upper surface of the fender upper portion 26 is curved in an arch shape in a side view, and a front portion and the rear portion of the fender upper portion 26 are lower than a central portion of the fender upper portion 26. Although traveling wind from the front side easily hits the front portion and the central portion of the fender upper portion 26, the traveling wind from the front side is less likely to hit the rear portion of the fender upper portion 26. At the rear portion of the fender upper portion 26, the sensor unit 30 is positioned below an upper end of the fender upper portion 26, that is, below a straight line L1 extending forward and rearward from the upper end of the fender upper portion 26. Therefore, the traveling wind from the front side is less likely to hit the sensor unit 30, and an increase in air resistance is reduced.

The tender side portions 27 protrude further outward in the vehicle width direction than the left and right side edges of the fender upper portion 26, and an upper surface of the fender side portion 27 connected to the fender upper portion 26 is formed stepwise in the vehicle width direction (see particularly FIG. 3). The upper surface of the fender side portion 27 is increased in height rearward, and a wind guide surface 28 for guiding traveling wind obliquely upward toward a rear side is formed by the upper surface of the fender side portion 27. The sensor unit 30 is located below an extension line L2 obtained by extending an upper edge of the wind guide surface 28 toward the rear side in a side view. Therefore, the traveling wind guided by the wind guide surface 28 of the fender side portion 27 is less likely to hit the sensor unit 30, and an increase in the air resistance is reduced.

As shown in FIGS. 5 and 6, the plurality of temperature sensors 31 of the sensor unit 30 are fixed to an inside of a sensor cover 41 via a sensor bracket 35. The sensor bracket 35 is formed in a plate shape elongated in the vehicle width direction, and the plurality of temperature sensors 31 are arranged in the vehicle width direction on a lower surface of the sensor bracket 35. Portions of the fender upper portion 26 that are corresponding to the plurality of temperature sensors 31 are opened, and a detection surface of each temperature sensor 31 is exposed from the corresponding opening of the fender upper portion 26. For example, an infrared temperature sensor that detects a surface temperature of the tire 23 based on an amount of infrared radiation emitted from the tire 23 is used as the plurality of temperature sensors 31.

The plurality of temperature sensors 31 and the sensor bracket 35 are covered by the sensor cover 41 from above. A front portion of the sensor cover 41 is formed along an outer surface of the fender upper portion 26, and a rear portion of the sensor cover 41 partially bulges away from the outer surface of the fender upper portion 26. A first bulging portion 42 is formed along the vehicle width direction at the rear portion of the sensor cover 41, and second bulging portions 43 (in particular, see FIG. 4) are formed on the rear side of the first bulging portion 42 at two locations on the left and right avoiding the center in the vehicle width direction. The second bulging portion 43 bulges more than the first bulging portion 42. The sensor bracket 35 and the plurality of temperature sensors 31 are accommodated inside the first bulging portion 42, and the wire 32 and a signal processing unit 33 (see FIG. 2) are accommodated inside the second bulging portion 43.

A front fixing portion 44 that is in contact with the outer surface of the fender upper portion 26 as a whole is formed in the front portion of the sensor cover 41. A rear fixing portion 45 that is in contact with the outer surface of the fender upper portion 26 is formed at the center in the vehicle width direction at the rear side of the first bulging portion 42. The front fixing portion 44 at the front side of the plurality of temperature sensors 31 and the rear fixing portion 45 at the rear side of the temperature sensor 31 are fixed to the fender upper portion 26, so that the sensor unit 30 is stably attached to the front fender 25. Since the plurality of temperature sensors 31 are fixed to the front fender 25 via the sensor cover 41, a wide fixing surface between the front fender 25 and the sensor cover 41 is secured.

The sensor cover 41 is entirely formed along the outer surface of the fender upper portion 26. Although the first bulging portion 42 is connected to the rear side of the front fixing portion 44, a stepped surface 46 between the front fixing portion 44 and the first bulging portion 42 is inclined so as to guide the traveling wind to the rear side in front of the temperature sensor 31. Although the second bulging portion 43 is connected to the rear side of the first bulging portion 42, a stepped surface 47 between the first and second bulging portions 42, 43 is inclined so as to guide the traveling wind to the rear side behind the temperature sensor 31. As described above, even if the first and second bulging portions 42, 43 are formed in the sensor cover 41, the traveling wind can flow smoothly to the rear side along the sensor cover 41 by the stepped surfaces 46, 47.

Figure 7:
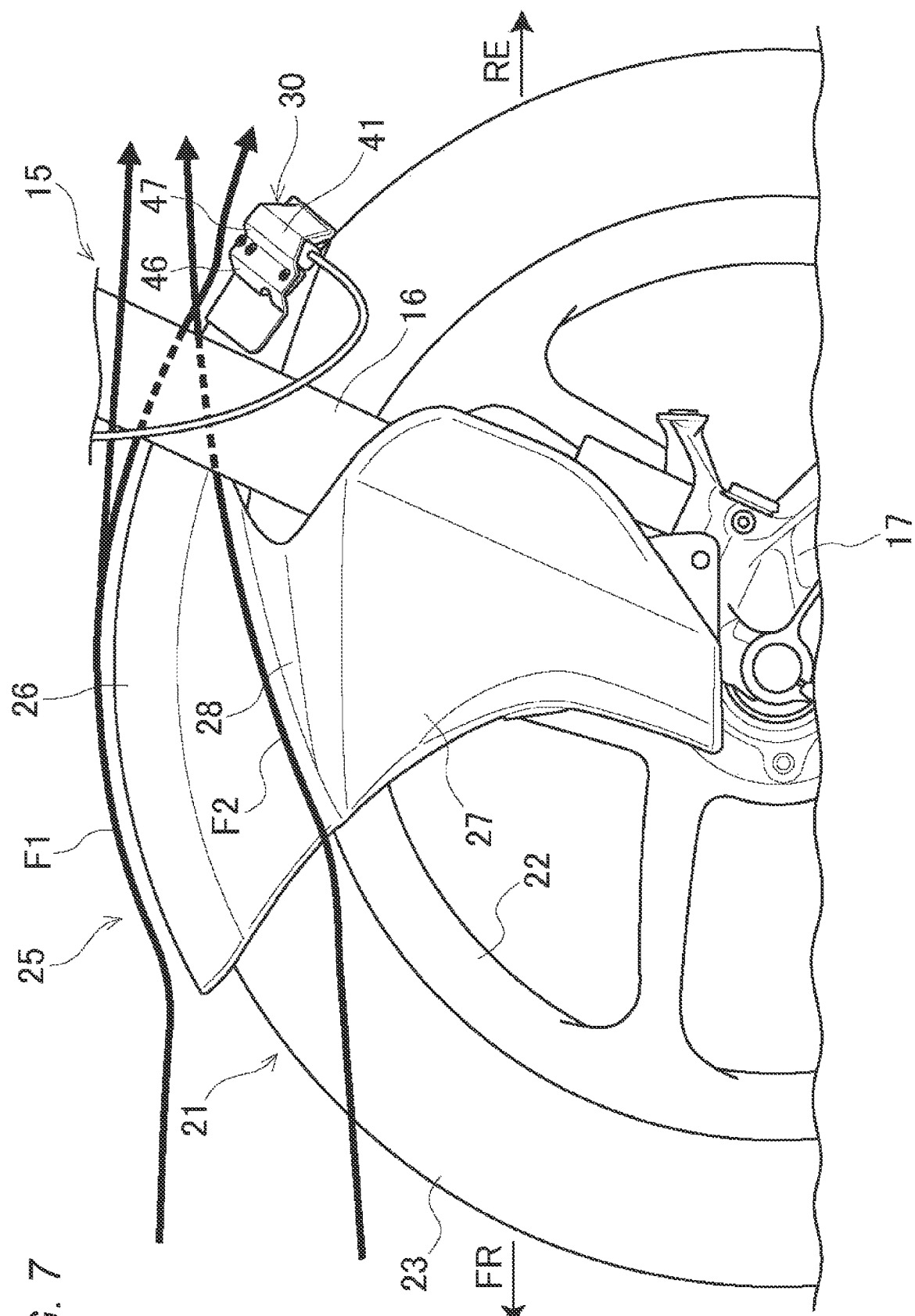
FIG. 7 is a diagram showing a flow of air around the front wheel according to the present embodiment.

A flow of air around the front wheel will be described with reference to FIG. 7. FIG. 7 is a diagram showing the flow of air around the front wheel according to the present embodiment.

As shown in FIG. 7, traveling wind F1, F2 flows along an outer surface of the front fender 25 during traveling of the straddle-type vehicle in a side view. The traveling wind F1 flows along the outer surface of the fender upper portion 26 from a front edge to the upper end of the fender upper portion 26. The traveling wind F1 partially peels off in the vicinity of the upper end of the fender upper portion 26, and only a part of the traveling wind F1 blows against the sensor unit 30 on a rear edge side of the fender upper portion 26. The sensor cover 41 of the sensor unit 30 has a shape along the outer surface of the fender upper portion 26, and the stepped surfaces 46 and 47 at bulging portions of the sensor cover 41 are inclined surfaces, so that the traveling wind F1 flows smoothly to the rear side and an increase in the air resistance is reduced.

As described above, the upper surface of the fender side portion 27 serves as the wind guide surface 28 that guides the traveling wind obliquely rearward, and the traveling wind F2 flows rearward along the wind guide surface 28 of the fender side portion 27. The fork tube 16 is positioned on the rear side of the wind guide surface 28, and the traveling wind F2 which passed through the wind guide surface 2$ passes through an inside of the fork tube 16. As a result, the traveling wind F2 passes above the sensor unit 30, and the traveling wind flows to the rear side of the front fender 25. Since the sensor unit 30 is out of the flow of the traveling wind F2, the traveling wind F2 is less likely to hit the sensor unit 30, and an increase in the air resistance is reduced.

As described above, according to the present embodiment, the sensor unit 30 is attached to the front fender 25, so that an increase in the weight of the front wheel 21 can be reduced, and the sensor unit 30 can be made compatible with the wired connection. In addition, the sensor unit 30 is attached to the rear portion of the front fender 25 where traveling wind hardly hits, so that the traveling wind is less likely to hit the sensor unit 30, and an increase in the air resistance is reduced.

In the present embodiment, the temperature sensor is illustrated as an example of the sensor, but the sensor is not particularly limited as long as it is a sensor capable of detecting a state of the tire.

Further, in the present embodiment, the sensor is attached to the front fender, but the sensor may be attached to a rear fender with a similar configuration.

Further, in the present embodiment, the front tender has the fender upper portion and the fender side portions, but the front fender may have at least the fender upper portion.

Further, in the present embodiment, the sensor unit is positioned below the upper end of the front fender, but the attachment position of the sensor unit is not particularly limited as long as the sensor unit is at the rear portion of the front fender.

Further, in the present embodiment, the sensor unit includes a plurality of sensors, but the sensor unit may include at least one sensor.

Further, in the present embodiment, the plurality of sensors are fixed to the sensor cover via the sensor bracket, but the plurality of sensors may be directly fixed to the sensor cover.

Further, in the present embodiment, the sensor cover is formed along the outer surface of the front tender, but the shape of the sensor cover is not particularly limited.

In addition, the straddle-type vehicle is not limited to a general vehicle on which a rider rides in a posture of straddling a seat, and also includes a small-sized scooter type vehicle on which a rider rides without straddling a seat.

As described above, a sensor attachment structure for a straddle-type vehicle according to the present embodiment includes: a sensor unit (30) including a sensor (temperature sensor 31) configured to detect a state of a tire (23); and a fender (front fender 25) formed along an outer surface shape of an upper portion of the tire. The sensor unit is attached to a rear portion of the fender and faces the tire. According to such a configuration, the sensor unit is attached to the fender, so that an increase in the weight of the wheel can be reduced, and the sensor unit can be made compatible with the wired connection. In addition, the sensor unit is attached to a rear portion of the tender where traveling wind hardly hits, so that the traveling wind is less likely to hit the sensor unit, and an increase in air resistance is reduced.

In the sensor attachment structure for a straddle-type vehicle according to the present embodiment, the sensor unit is located below an upper end of the fender. According to such a configuration, the traveling wind from the front side is less likely to hit the sensor unit, and an increase in the air resistance is reduced.

In the sensor attachment structure for a straddle-type vehicle according to the present embodiment, the fender includes a fender upper portion (26) covering the upper portion of the tire and fender side portions (27) extending downward from both side edges of the fender upper portion. The fender side portions are each formed with an wind guide surface (28) that is configured to guide traveling wind obliquely upward toward a rear side, and the sensor unit is located below an extension line (L2) of the wind guide surface in a side view. According to such a configuration, the traveling wind guided by the wind guide surface of the fender side portion is less likely to hit the sensor unit, and an increase in the air resistance is reduced.

In the sensor attachment structure for a straddle-type vehicle according to the present embodiment, the sensor unit includes a sensor cover (41) that covers the sensor from above, and the sensor cover is formed along an outer surface of the fender. According to such a configuration, the traveling wind smoothly flows to the rear side along the sensor cover, and an increase in the air resistance is reduced.

In the sensor attachment structure for a straddle-type vehicle according to the present embodiment, the sensor cover is formed with a stepped surface (46) inclined so as to guide traveling wind to a rear side in front of the sensor. According to such a configuration, the traveling wind can flow more smoothly to the rear side along the sensor cover.

In the sensor attachment structure for a straddle-type vehicle according to the present embodiment, the sensor is a plurality of sensors arranged in a vehicle width direction, and the sensor unit includes a sensor bracket (35) that supports the plurality of sensors. According to such a configuration, the support rigidity of the plurality of sensors can be increased by the sensor bracket.

In the sensor attachment structure for a straddle-type vehicle according to the present embodiment, the sensor cover covers the plurality of sensors and the sensor bracket from above, and the plurality of sensors are fixed to the sensor cover via the sensor bracket. According to such a configuration, the plurality of sensors are fixed to the fender via the sensor cover, so that a wide fixing surface between the fender and the sensor cover can be secured.

In the sensor attachment structure for a straddle-type vehicle according to the present embodiment, the sensor cover is fixed to the fender at a front side and a rear side of the sensor. According to such a configuration, the sensor unit can be stably attached to the fender.

Although the present embodiment has been described, the above-described embodiment and a modification may be combined in whole or in part as another embodiment.

The technique of the present invention is not limited to the above-described embodiment, and various changes, substitutions and modifications may be made without departing from the spirit of the technical concept of the present invention. The present invention may be implemented by other methods as long as the technical concept can be implemented by the methods through advance of the technique or other derivative techniques. Accordingly, the claims cover all embodiments that may be included within the scope of the technical concept.

What is claimed is:

1. A sensor attachment structure for a straddle-type vehicle comprising:
   a sensor unit including a sensor configured to detect a state of a tire; and
   a fender formed along an outer surface shape of an upper portion of the tire,
   wherein the sensor unit is attached to a rear portion of the fender and faces the tire in a radial direction of the tire;
   wherein the fender includes a fender upper portion covering the upper portion of the tire and fender side portions extending downward from both side edges of the fender upper portion,
   wherein the fender side portions are each formed with a wind guide surface that is configured to guide traveling wind obliquely upward toward a rear side, and
   wherein the sensor unit is located below an extension line of the wind guide surface in a side view.

2. The sensor attachment structure according to claim 1, wherein the sensor unit is located below an upper end of the fender.

3. The sensor attachment structure according to claim 1, wherein the sensor unit includes a sensor cover that covers the sensor from above, and
   wherein the sensor cover is formed along an outer surface of the fender.

4. The sensor attachment structure according to claim 3, wherein the sensor cover is formed with a stepped surface inclined so as to guide traveling wind to a rear side in front of the sensor.

5. The sensor attachment structure according to claim 3, wherein the sensor is a plurality of sensors arranged in a vehicle width direction, and
   wherein the sensor unit includes a sensor bracket that supports the plurality of sensors.

6. The sensor attachment structure according to claim 5, wherein the sensor cover covers the plurality of sensors and the sensor bracket from above, and
   wherein the plurality of sensors are fixed to the sensor cover via the sensor bracket.

7. The sensor attachment structure according to claim 3, wherein the sensor cover is fixed to the fender at a front side and a rear side of the sensor.

8. The sensor attachment structure according to claim 1, wherein
   the sensor unit is configured to detect a temperature of the tire, and
   the sensor unit is disposed at a center in a left-right direction of the tire.

9. The sensor attachment structure according to claim 1, wherein
   the sensor unit is configured to detect a temperature of the tire, and
   the sensor unit extends between a left side of the tire and a right side of the tire beyond a center in a left-right direction of the tire.

10. A sensor attachment structure for a straddle-type vehicle comprising:
   a sensor unit including a sensor configured to detect a state of a tire; and
   a fender formed along an outer surface shape of an upper portion of the tire,
   wherein the sensor unit is attached to a rear portion of the fender and faces the tire in a radial direction of the tire;
   wherein the sensor unit includes a sensor cover that covers the sensor from above, and
   wherein the sensor cover is formed along an outer surface of the fender.

* * * * *